UNITED STATES PATENT OFFICE.

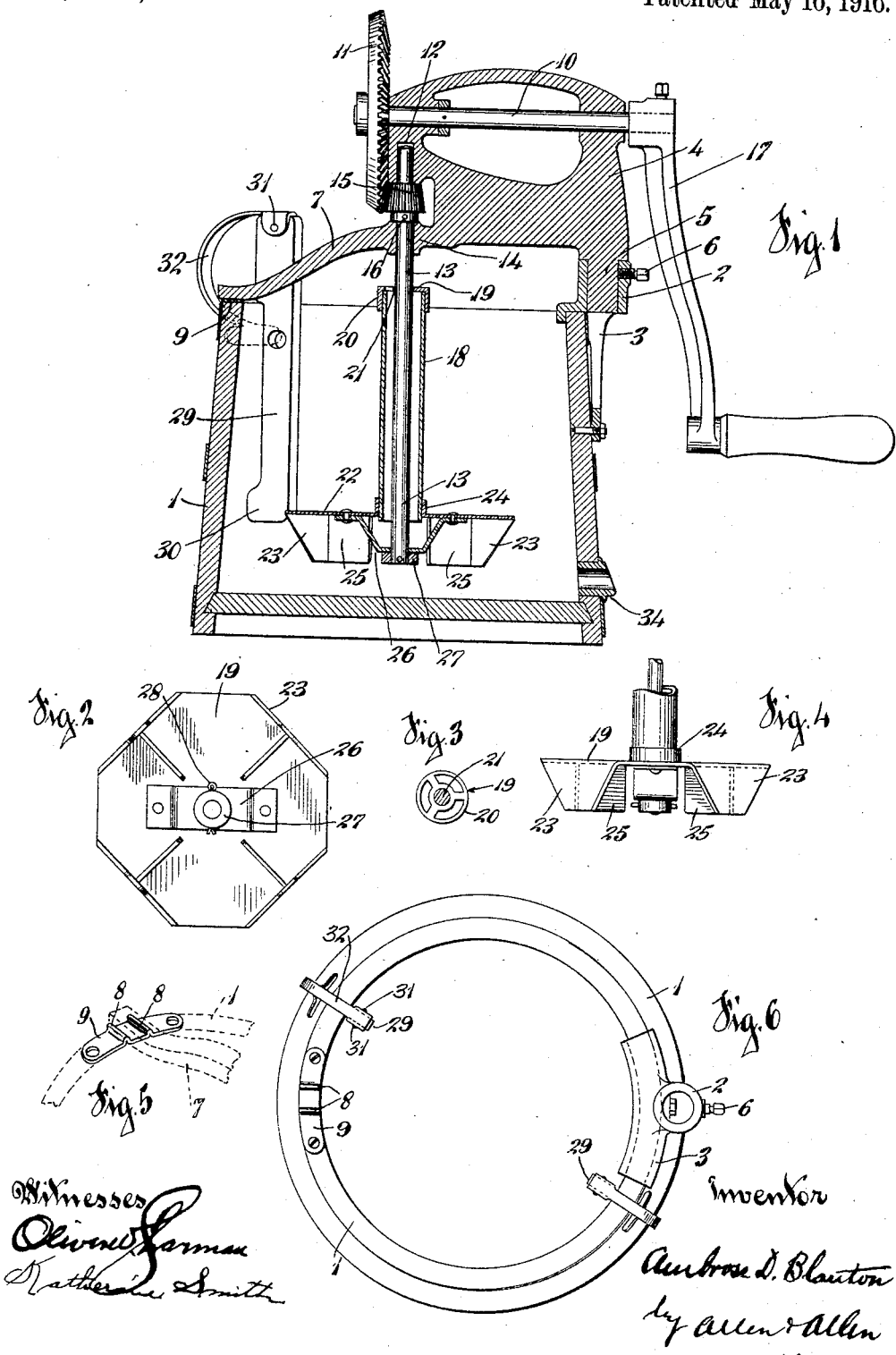

AMBROSE D. BLANTON, OF CINCINNATI, OHIO.

BUTTER-SEPARATOR.

1,182,888.  Specification of Letters Patent.  Patented May 16, 1916.

Application filed November 18, 1914. Serial No. 872,701.

*To all whom it may concern:*

Be it known that I, AMBROSE D. BLANTON, a citizen of the United States, and a resident of Cincinnati, in the county of Hamilton and State of Ohio, have invented certain new and useful Improvements in Butter-Separators, of which the following is a full, clear, and exact description, reference being had to the accompanying drawings, forming a part of this specification.

My invention relates to butter separators of the aerating type, in which centrifugal motion is imparted to a quantity of cream by means of a revolving agitator and into which agitator there is a direct conduit for the passage of air that is drawn by the centrifugally created vacuum into the cream. As is well known, the separation of butter fats from cream will be accomplished in a very short time if the cream is thoroughly permeated with air and beaten up when in such condition.

The object of my invention is to materially simplify the structure of devices of this nature, making them easier to manipulate by an unskilled operator, and easier to clean.

Furthermore, it is my object to provide an agitator for the cream of new design, so that the cream will be aerated in one half to one third the time required by old separators of the same class, and also to improve the general structural features of such separators to strengthen, and at the same time lower the cost of the same. This object I accomplish by that certain construction and arrangement of parts to be hereinafter specifically pointed out and claimed.

In the drawings, Figure 1 is a central vertical section of the separator complete. Fig. 2 is a bottom plan view of the agitator. Fig. 3 is a plan view of the upper mounting piece for the tubular shaft. Fig. 4 is a side elevation of the agitator. Fig. 5 is a perspective view of the groove plate for holding the supporting arm of the driving mechanism bracket. Fig. 6 is a top plan view of the separator with the agitating mechanism removed.

The tub or vessel 1 of the size desired is provided at one side with a socket or journal 2 formed integral with a plate 3 bolted to the edge of the vessel (Figs. 1 and 6). The bracket 4, which provides mounting means for the driving mechanism, has a post 5 adapted to seat in this socket, and a set screw 6 is provided to lock the connection when the parts are in use. The bracket extends out to the center of the vessel, with its main portion ending at this point, and with an additional supporting arm 7 extending across to the opposite edge of the vessel where it seats in a groove formed by the beads 8, 8, in the groove plate 9 secured to the edge in the desired position.

A shaft 10 is revolubly mounted horizontally in the bracket, and at its terminus has fixedly secured to it a beveled gear 11. The bracket has a socket 12 for the end of the agitator shaft 13 and a journal 14 below the socket, for this shaft. Set in between the socket and the journal is a beveled pinion 15, fixedly secured by a pin 16 to the shaft. The gear 11 is located so as to mesh with the pinion, and a crank 17 is mounted on the other end of the shaft 10 for manipulation by the operator. A tubular shaft 18 is provided, around the lower end of which the agitator is secured as will be described. A mounting piece 19 is stamped out (Fig. 3), having a collar 20 of a size to non rotatably engage the end of the tube 18, when driven onto it, and having a central aperture 21 adapted in like manner to engage the shaft 13.

The agitator is formed of a sheet of metal stamped out to have a flat octagonal upper surface 22, with four triangular opposed depending ears 23. It has a collar 24 stamped out and driven over the end of the tubular shaft 18, as in the case of the collar 20 first mentioned. The agitator on its under side has set into it four rectangular radial vanes 25, which abut against the ears at their outer edge, and terminate at the inner edge near the aperture of the tube. Also secured to the top 22 is riveted a depending supporting bracket 26, for a collar 27. This collar and the shaft 13 are provided with proper holes for a cotter pin 28, thus providing a base support for the agitator member.

It can readily be appreciated that the structure now described is of simple and durable nature. The agitator and its mountings are preferably of aluminum, and wherever possible designed so as to be stamped out. The tubular shaft is mounted both at top and bottom to the shaft 13 which passes through its axis, thus giving it adequate support, which is materially lacking in many of the devices of this nature in the art.

The mounting means is a distinct improvement in the art. It will be understood that every time the separator is used, the agitating mechanism must be removed and cleaned and remounted when used again. The structure provided here is easily set in place and removed, the only adjusting being that of the set screw in the socket member for the bracket. The additional supporting arm not only supports the driving mechanism, but it also prevents its rotating on its pin and socket mounting, thereby giving additional security to the set screw. The method of attaching the agitator proper over the tubular shaft and the driving shaft is also well calculated for ease of operation and durability. A cotter pin effectively locks the parts together at the base, and the collar portion stamped in the upper surface of the agitator permits of the agitator being worked off or onto the shaft with but little effort or delay. This mounting means is arranged so that the agitator is detachable. It makes for standardization of parts and of easy replacement in case repairs are necessary. It is also desirable at frequent intervals to detach the agitator to clean and sterilize it thoroughly. The extending of the driving shaft clear through the tubular member, with the double support thus provided, does away with the wabbling of the agitator, which has seriously interfered with the devices of this nature in the art, as this wabbling throws the driving mechanism out of plumb and vibrates the vessel so that it is hard to hold. It is a very valuable improvement.

The brake strips 29 are provided, preferably two in number, and made of wood. They are provided with a nose 30 at the lower end to abut against the side of the vessel and hold the body of the strip away therefrom, and at their upper end are riveted between the ears 31, 31, of a strong spring clip 32. By means of the clip, these braces are held in place, but are easily removable for cleansing and sterilizing.

It is believed that the structure now described and the purposes of the features particularly noted are readily to be understood. It remains to be described, the manner of operation of the device and particularly of the agitator. It is old in the art to employ an agitator with an unbroken upper surface, to prevent splashing, and it is also old to provide some means of stopping the flow at the sides of the agitator such as abutments in the bottom of the bucket, or by making the agitator a double box-like device having several apertures in the sides as shown in the patent to Alpheus Fay, No. 1,032,663, of July 16, 1912. It has been found, however, that splashing will be adequately stopped, without undue breaking of the centrifugal motion in the bottom of the vessel, by using the triangular ears heretofore described. The vanes being straight radially set up a much more violent motion of the cream than the double box agitator mentioned above, and when the agitator is revolved, these vanes or beaters throw out the cream with great force causing it to suck down a large volume of air. The amount retained in the bottom of the vessel becomes thoroughly saturated with air and beaten up and in whirling around the vessel's wall is stopped by the brake strips, with some of the cream passing between the strips and the vessel's wall, thereby setting up eddy currents.

In operating the machine, the parts are cleaned carefully and the cream placed in the vessel. The agitating mechanism complete is then set in and secured tightly in place by the set screw, and the brake strips are inserted. The operator then turns the crank with a slow regular motion, thereby beating up and aerating the cream as described. Within a short time separation takes place. The buttermilk is drained out through the tap or outlet 34, and water poured in in its place. This washes the butter fats, and the agitating mechanism is removed so as to allow the butter to be taken out with a sieve. The whole operation is many times shorter than that in any separator or churn known to me, which is due to the special nature of the new beater.

Having thus described my invention, what I claim as new and desire to secure by Letters Patent, is:—

1. In a device of the character specified, in combination with a conduit for air thereto, a submerged agitator having a nonagitating upper surface, and interspaced peripheral and straight radial portions depending therefrom to form a lower agitating surface, for the purpose described.

2. In a device of the character specified, in combination with a conduit for air thereto, a submerged agitator having a nonagitating upper surface, ears having spaces between them depending from the periphery thereof, and agitating means depending from the lower surface thereof to form an agitating lower surface therefor, for the purpose described.

3. In a device of the character specified, in combination with a conduit for air thereto, a submerged agitator having inverted triangular circumferential ears and vanes abutting against the median line of said ears to form an agitating lower surface, for the purpose described.

4. In a device of the character specified, in combination with a conduit for air thereto, a submerged agitator having inverted triangular circumferential ears and straight radial vanes abutting against the median line of said ears to form an agitating lower surface, for the purpose described.

5. In a device of the character specified, in combination with a conduit for air thereto, a submerged agitator having a nonagitating upper surface, four inverted triangular circumferential ears, and four radial vanes abutting against the ears along their median line.

6. In a device for separating butter by aeration and agitation, a driving shaft, a tubular shaft, a perforate securing piece stamped to fit the driving shaft tightly and with a collar portion to be driven on the tubular shaft at its upper end, and an agitator having a portion thereof stamped out to form a collar adapted to be driven on the tubular shaft at its lower end and means for locking the shaft to the agitator.

7. In a device for separating butter by aeration and agitation, a driving shaft, a tubular shaft, a perforate securing piece stamped to fit the driving shaft tightly and with a collar portion to be driven on the tubular shaft at its upper end, and an agitator having a portion thereof stamped out to form a collar adapted to be driven on the tubular shaft at its lower end, a collar adapted to fit the driving shaft and be secured thereto by a cotter pin, and means for mounting said collar on the agitator.

AMBROSE D. BLANTON.

Witnesses:
OLIVER W. SHARMAN,
KATHERINE SMITH.

Copies of this patent may be obtained for five cents each, by addressing the "Commissioner of Patents, Washington, D. C."